G. J. KELLEY.
VAGINAL SYRINGE.
APPLICATION FILED JAN. 23, 1911.
1,015,895.
Patented Jan. 30, 1912.
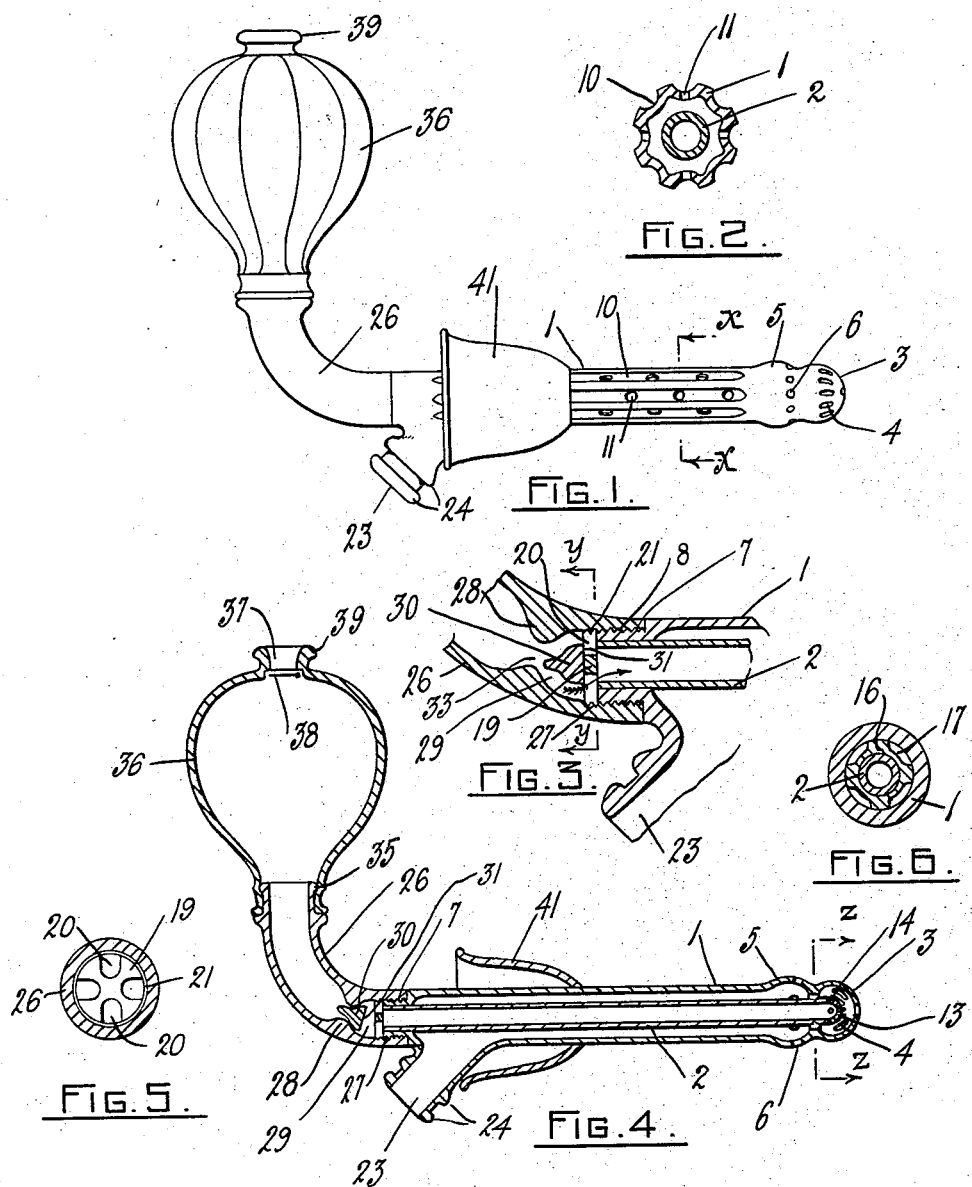
WITNESSES.
Albert G. Piegenthowski.
George H. McLaughlin.
INVENTOR.
George J. Kelley
By Horatio E. Bellows
ATTORNEY.

UNITED STATES PATENT OFFICE.

GEORGE J. KELLEY, OF ATTLEBORO, MASSACHUSETTS.

VAGINAL SYRINGE.

1,015,895.   Specification of Letters Patent.   Patented Jan. 30, 1912.

Application filed January 23, 1911. Serial No. 604,068.

*To all whom it may concern:*

Be it known that I, GEORGE J. KELLEY, a citizen of the United States, residing at Attleboro, in the county of Bristol and State of Massachusetts, have invented certain new and useful Improvements in Vaginal Syringes, of which the following is a specification.

My invention relates to vaginal syringes and has for its essential objects compactness, adaptability for disassemblage, convenience in manipulation and without contact of the hand with the flow, the perfect segregation of the clean and foul liquids during the cleansing operation, and without the employment of suctional means, and adaptability for cleansing.

Other features of advantage will hereinafter appear in the specifications.

My invention consists in such novel parts, combinations, and arrangement of parts as fall within the scope of the appended claims.

In the accompanying drawings which form a part of this specification, and wherein like reference characters indicate like parts throughout the views, Figure 1 is a side elevation of my novel syringe, Fig. 2 a section on line $x\ x$ of Fig. 1, Fig. 3, an enlarged central longitudinal section of an intermediate portion of the syringe, Fig. 4, a longitudinal section of the entire syringe, and Figs. 5 and 6, sections respectively on line $y\ y$ of Fig. 3 and $z\ z$ of Fig. 4.

My syringe comprises in detail two concentric tubes 1 and 2; the former or outer tube has a closed hemispherical end 3 provided with perforations 4, and a swelled portion 5 adjacent the end provided also with an annular series of perforations 6. The portions 3 and 5 form a head or nozzle. The tube is of reduced diameter at its opposite end as at 7 and is provided with external screw threads 8. The exterior of the intermediate portion of the tube is provided with a series of longitudinally disposed grooves or channels 10 arranged around the tube through the bottom of which channels there occur at intervals perforations 11. The tube 2 which is somewhat shorter than tube 1 has also a closed hemispherical end 13 provided with perforations 14. Located below these perforations is a disk 16 fixed at its periphery to the inner surface of the tube 1 and provided with openings 17. Abutting against the inner ends of the tubes 1 and 2 is a second disk 19 having annularly arranged openings 20 and provided with threads 21 upon its periphery.

A rearwardly inclined effluent or discharge tube 23 extends from the rear portion of the tube 1 and is provided with a retaining knob 24 upon its end. A curved section or tube 26 has one end interiorly threaded as at 27 to engage threads 7 and 21 and is provided with an internal annular shoulder 28 which forms a chamber 29 in the forward end of the tube 26, and constitutes a seat for a conical shaped floating check valve 30, whose plane surface or base 31 is of less diameter than the disk 19 thereby permitting egress of water therearound through the openings 20 when the valve is unseated as shown by the arrows in Fig. 3. In closed position the conical portion of the valve, as shown in Fig. 4, closes the passage 33 through its seat 28. The outer end of the curved tube is provided with a retaining knob 35 engaged by one end of a pressure bulb 36 provided with an opening 37 in which is a check valve 38 operating in the well known manner to admit liquid to the bulb through the knob 39 adapted to receive the usual supply pipe. An approximately cone shaped shield or protector 41 is fixed to the tube 1 near its rear end.

The operation of the device is as follows: The tube 1 is inserted into the body, and the bulb 36 which is disposed at right angles to the tube 1 and therefore out of the path of any flow from the body is compressed forcing the cleansing liquid from the bulb through the orifice 33, openings 20, tube 2, and perforations 14, and 4. After the expulsion of the water the valve 30 drops into its seat 28 thus closing the orifice 33, and the expelled liquids enter by gravity through the various perforations 4, 14, 6, and 11 back into the annulus between tubes 1 and 2, and passes thence out through the effluent tube 23, without contaminating the liquid entering the bulb 36 through the passage 37 as the bulb is distending preparatory for a new injection. The threaded connection of the portion 7 and disk 19 with the forward end of the tube 26 makes the disassemblage of the three parts possible and convenient for cleansing or packing. The enlarged portion 5 of the tube 1 forms a shoulder adapted to afford ingress of the expelled liquid through the perforations 6; while the channels 10 facilitate the flow of the liquid to and through the openings 11.

What I claim is,

1. In a vaginal syringe, the combination of an educt tube provided with openings in its side wall and perforations at its forward end, an induct tube shorter than the educt tube fixed within the latter and provided with perforations in its forward end, a rearwardly-extended discharge tube upon the educt tube, a bulb, a tube carrying the latter and connected with said educt tube, a disk with openings in said bulb-carrying tube, and a valve for coöperation with said disk and having a base of less diameter than the disk.

2. In a vaginal syringe, the combination of an educt tube provided with openings in its side wall and perforations at its forward end, an induct tube shorter than the educt tube fixed within the latter and provided with perforations at its forward end, a rearwardly-extended discharge tube upon the educt tube, a bulb, a curved tube carrying the latter and connected with said educt tube, a disk with openings disposed in said curved tube, a valve for coöperation with said disk and having a base of less diameter than the disk, and means within said curved tube forming a chamber and a seat for said valve.

3. In a vaginal syringe, the combination of an educt tube provided with openings in its side wall and perforations at its forward end, an induct tube shorter than the educt tube fixed within the latter and provided with perforations at its forward end, a rearwardly-extended discharge tube upon the educt tube, a bulb, a curved tube carrying the latter and connected with said educt tube, a disk with openings disposed in said curved tube, a valve for coöperation with disk and having a base of less diameter than the disk and means within said curved tube, forming a chamber and a seat for said valve, said disk and valve being disposed between said bulb and the discharge tube.

4. In a vaginal syringe, the combination of an educt and an induct tube concentrically disposed with relation to each other, and each provided with perforations upon its forward end, a third tube engaging the educt tube and communicating only with the induct tube, and provided with a valve seat, a valve in said third tube for coöperation with the seat, means within said third tube having peripheral openings, said means being of greater diameter than the base of said valve, and a bulb upon the third tube.

5. In a vaginal syringe, the combination of an educt tube provided with exterior threads upon its rear end portion, an induct tube within the educt tube, a disk upon the ends of the induct and educt tubes provided with openings leading into the induct tube, a discharge tube in the side of the educt tube, a bulb, a connecting tube upon the bulb provided with threads adapted to engage the threads upon the educt tube, a valve seat in said connecting tube, and a valve in the last mentioned tube intermediate the seat and the disk.

In testimony whereof I have affixed my signature in presence of two witnesses.

GEORGE J. KELLEY.

Witnesses:
HORATIO E. BELLOWS,
GEORGE H. MCLAUGHLIN.

---

Copies of this patent may be obtained for five cents each, by addressing the "Commissioner of Patents, Washington, D. C."